United States Patent
Gil et al.

(10) Patent No.: US 9,086,794 B2
(45) Date of Patent: Jul. 21, 2015

(54) DETERMINING GESTURES ON CONTEXT BASED MENUS

(75) Inventors: Erez Kikin Gil, Redmond, WA (US); Matthew Kotler, Sammamish, WA (US); Vignesh Sachidanandam, Mercer Island, WA (US); Andrew Hockman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 38 days.

(21) Appl. No.: 13/339,569

(22) Filed: Dec. 29, 2011

(65) Prior Publication Data

US 2013/0019205 A1   Jan. 17, 2013

Related U.S. Application Data

(60) Provisional application No. 61/556,945, filed on Nov. 8, 2011, provisional application No. 61/507,983, filed on Jul. 14, 2011.

(51) Int. Cl.
  *G06F 3/0488* (2013.01)
  *G06F 3/0482* (2013.01)
  *G06F 3/0489* (2013.01)

(52) U.S. Cl.
  CPC ............ *G06F 3/0488* (2013.01); *G06F 3/0482* (2013.01); *G06F 3/04886* (2013.01); *G06F 3/04895* (2013.01)

(58) Field of Classification Search
  CPC ............................ G06F 3/017; G06F 3/03547
  USPC ......... 715/862, 834, 822, 823, 812, 863, 810, 715/841
  See application file for complete search history.

(56) References Cited

U.S. PATENT DOCUMENTS

| | | |
|---|---|---|
| 5,798,760 A | 8/1998 | Vayda et al. |
| 6,259,436 B1 * | 7/2001 | Moon et al. ............... 345/173 |
| 6,281,879 B1 | 8/2001 | Graham |
| 6,542,164 B2 | 4/2003 | Graham |
| 6,828,988 B2 | 12/2004 | Hudson et al. |
| D563,972 S | 3/2008 | Sherry |
| 7,533,340 B2 | 5/2009 | Hudson et al. |
| 7,570,943 B2 | 8/2009 | Sorvari et al. |
| 7,710,409 B2 | 5/2010 | Robbin et al. |
| 7,712,049 B2 | 5/2010 | Williams et al. |
| 7,895,531 B2 | 2/2011 | Radtke et al. |
| 8,239,882 B2 | 8/2012 | Dhanjal et al. |

(Continued)

OTHER PUBLICATIONS

"Context Menus and Sub-Menus", Retrieved at <<http://ignorethecode.net/blog/2009/03/21/context-menus-sub-menus/>>, Mar. 21, 2009, pp. 9.

(Continued)

*Primary Examiner* — Amy Ng
*Assistant Examiner* — Sang H Kim
(74) *Attorney, Agent, or Firm* — Jessica Meyers; Jim Ross; Micky Minhas

(57) ABSTRACT

Context based menus are employed for content management through touch or gesture actions, keyboard entries, mouse or pen actions, and similar input. Different actions and combinations of actions enable users to activate sub-menus, execute commands, or collapse context based menus. Gestures associated with the actions are determined through action analysis. The action analysis includes tap action hit target region analysis and swipe action direction, angle, and/or length analysis.

12 Claims, 9 Drawing Sheets

(56) References Cited

U.S. PATENT DOCUMENTS

| | | | |
|---|---|---|---|
| 8,245,156 | B2 | 8/2012 | Mouilleseaux et al. |
| 2002/0186238 | A1* | 12/2002 | Sylor et al. ................... 345/736 |
| 2005/0216834 | A1 | 9/2005 | Gu |
| 2007/0055936 | A1 | 3/2007 | Dhanjal et al. |
| 2007/0168890 | A1 | 7/2007 | Zhao et al. |
| 2007/0180392 | A1 | 8/2007 | Russo |
| 2007/0192742 | A1* | 8/2007 | Lee et al. ...................... 715/828 |
| 2007/0256029 | A1 | 11/2007 | Maxwell |
| 2007/0271528 | A1 | 11/2007 | Park et al. |
| 2008/0222569 | A1* | 9/2008 | Champion et al. ............ 715/834 |
| 2008/0316183 | A1* | 12/2008 | Westerman et al. .......... 345/173 |
| 2009/0037813 | A1 | 2/2009 | Newman et al. |
| 2009/0083665 | A1 | 3/2009 | Anttila et al. |
| 2009/0327963 | A1* | 12/2009 | Mouilleseaux et al. ....... 715/834 |
| 2010/0185985 | A1* | 7/2010 | Chmielewski et al. ........ 715/834 |
| 2010/0192102 | A1 | 7/2010 | Chmielewski et al. |
| 2010/0238129 | A1* | 9/2010 | Nakanishi et al. ............. 345/173 |
| 2010/0299637 | A1 | 11/2010 | Chmielewski et al. |
| 2010/0306702 | A1 | 12/2010 | Warner |
| 2011/0209087 | A1* | 8/2011 | Guyot-Sionnest ............. 715/799 |
| 2011/0209093 | A1 | 8/2011 | Hinckley et al. |
| 2011/0243380 | A1* | 10/2011 | Forutanpour et al. ......... 382/103 |
| 2011/0248928 | A1 | 10/2011 | Michaelraj |
| 2012/0030624 | A1* | 2/2012 | Migos ............................ 715/830 |
| 2012/0036434 | A1* | 2/2012 | Oberstein ...................... 715/702 |
| 2012/0042006 | A1 | 2/2012 | Kiley |
| 2012/0056819 | A1* | 3/2012 | Peterson et al. ............... 345/173 |
| 2012/0221976 | A1 | 8/2012 | Johns |

OTHER PUBLICATIONS

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

Koenig, Joerg, "Radial Context Menu", Retrieved at <<http://www.codeproject.com/KB/system/RadialContextMenu.aspx>>, Jul. 21, 2005, pp. 4.

"Pie menu", Retrieved at <<http://web.archive.org/web/20110331143948/http://en.wikipedia.org/wiki/Pie_menu>>, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie in the Sky", Retrieved at <<http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android ", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

Lepinski, et al., "The Design and Evaluation of Multitouch Marking Menus", Retrieved at <<http://www.autodeskresearch.com/pdf/chi2010_mtmm.pdf>>, Proceedings of the 28th international conference on Human factors in computing systems, Apr. 10-15, 2010, pp. 2233-2242.

Bailly, et al., "Flower Menus: A New Type of Marking Menu with Large Menu Breadth, Within groups and Efficient Expert Mode Memorization", Retrieved at <<http://iihm.imag.fr/publs/2008/FlowerMenu.pdf>>, Proceedings of the working conference on Advanced visual interfaces, May 28-30, 2008, pp. 15-22.

Bailly, et al., "Finger-Count & Radial-Stroke Shortcuts: Two Techniques for Augmenting Linear Menus on Multi-Touch Surfaces", Retrieved at <<http://www.gillesbailly.fr/data/doc/pdf/BAILLY_FINGERCOUNT_CHI10.pdf>>, Proceedings of the 28th international conference on Human factors in computing systems, Apr. 10-15, 2010, pp. 591-594.

Francone, et al., "Wavelet Menus: A Stacking Metaphor for Adapting Marking Menus to Mobile Devices", Retrieved at <<http://www.gillesbailly.fr/data/doc/pdf/BAILLY_MOBILEHCI09.pdf>>, Proceedings of the 11th International Conference on Human-Computer Interaction with Mobile Devices and Services, Sep. 15-18, 2009, pp. 927-936.

Isokoski, Poika, "Performance of Menu-Augmented Soft Keyboards", Retrieved at <<http://www.google.co.in/url?sa=t&source=web&cd=2&sqi=2&ved=OCCgQFjAB&url=http%3A%2F%2Fciteseencist.psu.edu%2Fviewdoc%2Fdownload%3Fdoi%3D10.1.1.109.2844%26rep%3Drep1%26type%3Dpdf&ei=lhdbTsf0OcPUrQeB_fyhCA&usg=AFQjCNECJWLev8125J2ZMsMdQvbEDDQbQQ>>, Proceedings of the SIGCHI conference on Human factors in computing systems, Apr. 24-29, 2004, pp. 423-430.

Kurtenbach, et al., "The Limits of Expert Performance Using Hierarchic Marking Menus", Retrieved at <<http://www.billbuxton.com/MMExpert.html>>, INTERCHI, Apr. 24-29, 1993, pp. 482-487.

"Compact Control Menu for Touch-Enabled Command", U.S. Appl. No. 13/090,438, filed Apr. 20, 2011, pp. 27.

* cited by examiner

DETERMINING GESTURES ON CONTEXT BASED MENUS

CROSS REFERENCE TO RELATED APPLICATIONS

This application claims the benefit of U.S. Provisional Patent Application Ser. No. 61/556,945 filed on Nov. 8, 2011 and U.S. Provisional Patent Application Ser. No. 61/507,983 filed on Jul. 14, 2011. The disclosures of the provisional patent application are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Limited display real estate burdens many portable devices from providing full featured content management functionality. Furthermore, gestural commanding is not efficient using conventional menus including support for limited displays or just taking into account where the user's finger/mouse/pen is. Additionally, display devices such as projectors, monitors, and televisions may lack controls for providing content management functionality. Modern software solutions such as on screen keyboards may be awkward to type and encompass valuable display area. Lack of adequate software solutions for managing content on non-traditional devices largely limit device use to content consumption. Carrying multiple devices for content management and consumption defeats portability and unnecessarily takes away from an enriching singular source for content consumption and management.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to determining gestures on context based menus employed in content management through touch or gesture actions, keyboard entries, mouse or pen actions, and similar input. Context based menus may be deployed using a variety of shapes, forms, and content. Different actions and combinations of actions may enable users to activate sub-menus, execute commands, or collapse context based menus. An action such as a tap action or a swipe action may be mapped to a gesture. A gesture associated with a tap action may be determined through an evaluation of a target hit region. Alternatively, a gesture associated with a swipe action may be determined through an evaluation of the swipe direction and location. By enabling viewing of menus and execution of commands through context based menus positioned in relation to displayed content user experience may be enhanced when interacting with user interfaces with limited display area.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
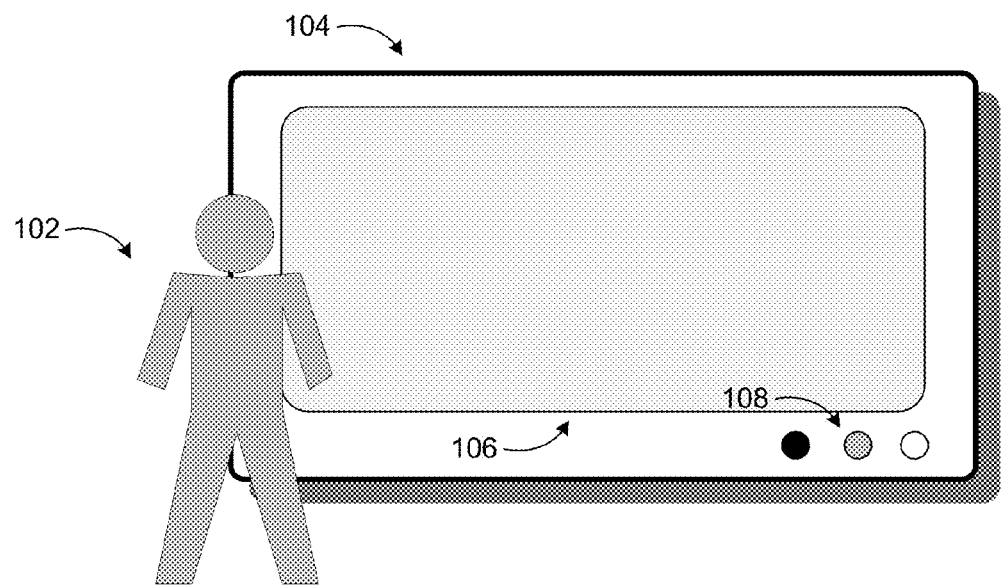
FIGS. 1A and 1B illustrate some example devices, where context based menus may be employed.
Figure 1A:
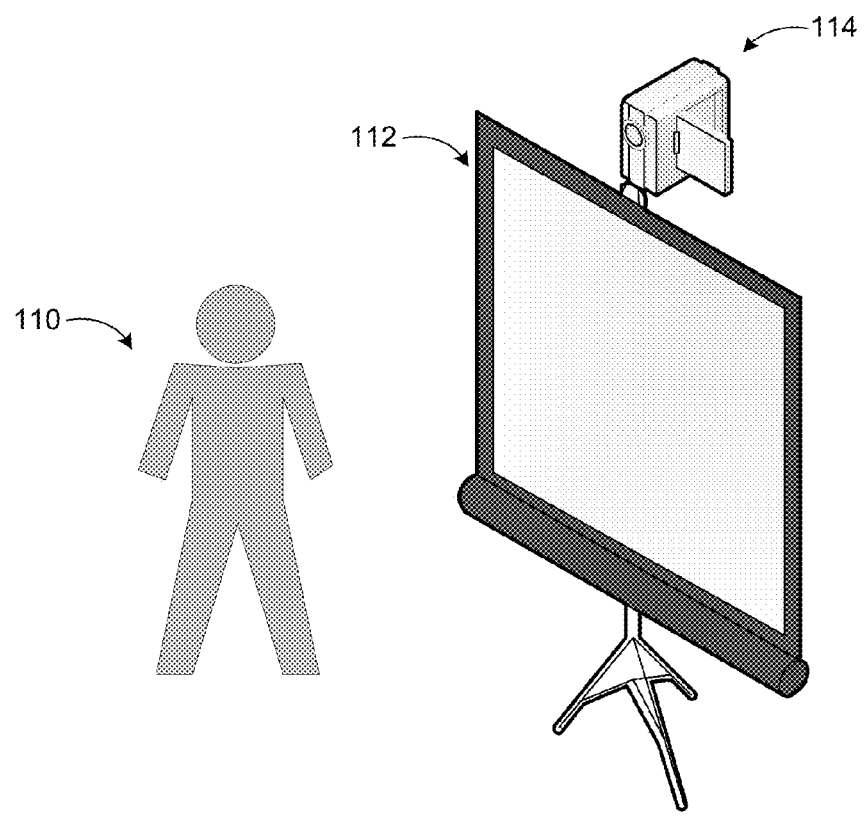

As briefly described above, a user interface may present a context based menu in relation to displayed content. The context based menu may provide commands, links or sub-menus to manage the displayed content. The device may detect a user action associated with the context based menu. The user action may be a tap action or a swipe action. A gesture associated with a tap action may be determined through an evaluation of a target hit region. Alternatively, a gesture associated with a swipe action may be determined through an evaluation of the swipe direction and location. The device may execute a command or display a sub-menu based on the determined gesture. Taps may also be related to swipes, such that a swipe which is not long enough to be considered a "true swipe" may be interpreted as a tap.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a user interface of a touch-enabled or gesture-enabled device may determine gestures in a context based menu according to a tap action or a swipe action analysis. A context based menu may make use of features specific to touch or gesture enabled computing devices, but may also work with a traditional mouse and keyboard. Context based menus are used to provide quick access to commonly used commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of commands for easy user access, but additional sub-menus may be presented upon user selection. Commonly used context based menus may appear over the viewed document. A tap or swipe action as used herein may be provided by a user through a finger, a pen, a mouse, or similar device, as well as through predefined keyboard entry combinations or a voice command. A pen input may be direct contact with surface or detection of pen near vicinity of a tablet surface. Other example input mechanisms may include, but are not limited to, accelerometer or orientation sensor based input, optically captured gestures, time-based input, proximity to other devices/people/places, and the like. A context based menu may also be at a fixed location and present similar behavior as the dynamically placed context based menus.

Figure 1B:
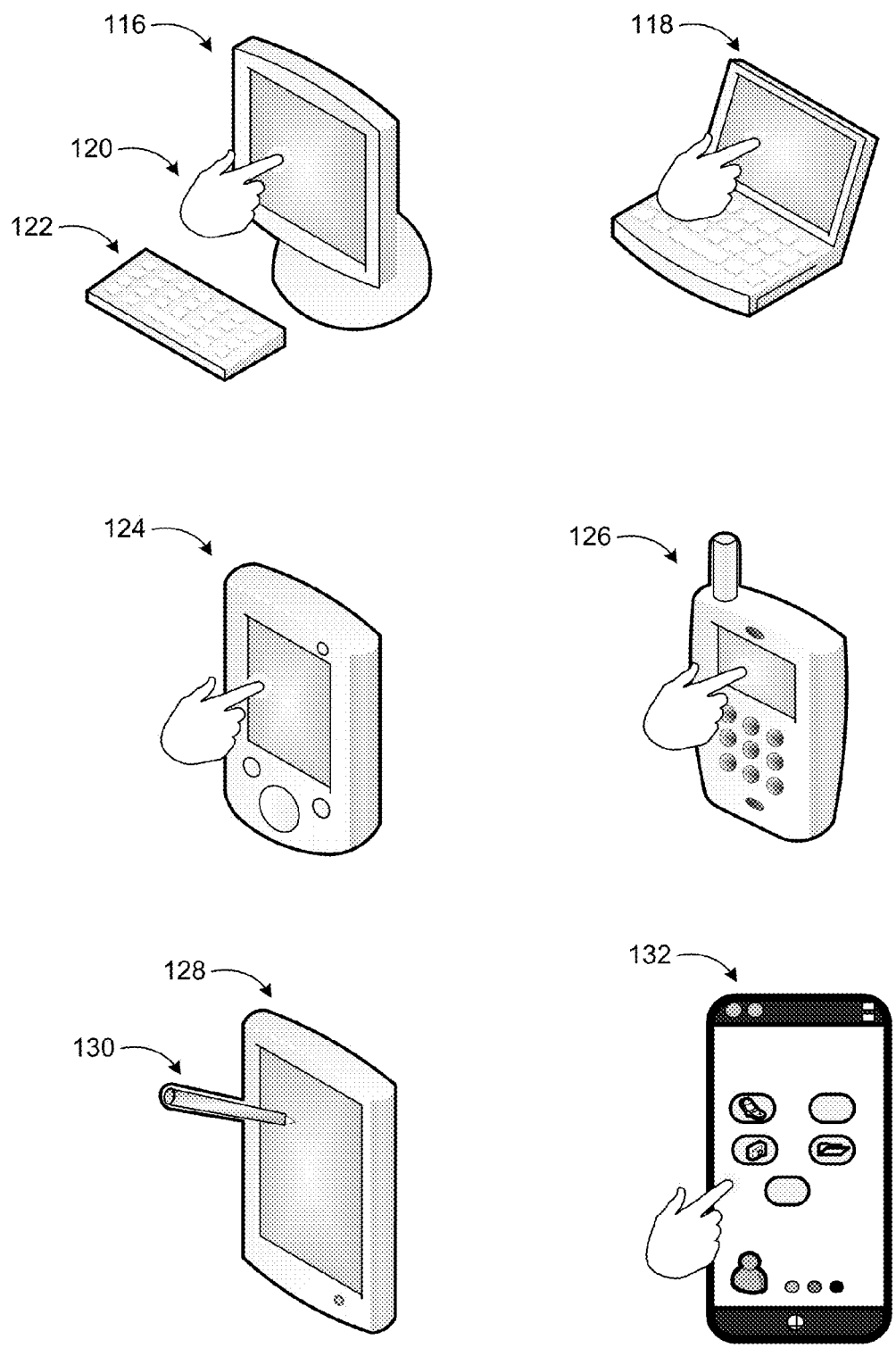

FIG. 1A and 1B illustrate some example devices, where a context based menus may be employed. As touch and gesture based technologies are proliferating and computing devices employing those technologies are becoming common, user interface arrangement becomes a challenge. Touch and/or gesture enabled devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Embodiments are directed to determining gestures on a context based menu.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space while providing ease of use without usurping much needed display area.

Referring to FIG. 1A and 1B, some example devices are illustrated, where a gesture may be determined on a context based menu according to embodiments. Embodiments may be implemented in touch and/or gesture enabled devices or others with keyboard/mouse/pen input, with varying form factors and capabilities.

Device 104 in FIG. 1A is an example of a large size display device, where a user interface may be provided on screen 106. Functionality of various applications may be controlled through hardware controls 108 and/or soft controls such as a context based menu displayed on screen 106. A user may be enabled to interact with the user interface through touch actions or gestures (detected by a video capture device). A launcher indicator may be presented at a fixed location or at a dynamically adjustable location for the user to activate the context based menu. Examples of device 104 may include public information display units, large size computer monitors, and so on. While example embodiments are discussed in conjunction with small size displays, where available display area is valuable and location, size, content, etc. of a context based menu may be determined based on available display area; the opposite consideration may be taken into account in larger displays. For example, in a large size display such as a public information display unit or a large size computer monitor, a context based menu may be dynamically positioned near selected content such that the user does not have to reach over to the menu or have to move it in order to work comfortably.

Device 112 in FIG. 1A is an example for use of a context based menu to control functionality. A user interface may be displayed on a screen or projected on a surface and actions of user 110 may be detected as gestures through video capture device 114. The user's gestures may be determined by an analysis of a user action to activate a context based menu to manage displayed content displayed on the device 112.

FIG. 1B includes several example devices such as touch enabled computer monitor 116, laptop computer 118, handheld computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus to manage displayed content. In addition, tools such as pen 130 may be used to provide touch input. A context based menu may be controlled also through conventional methods such as a mouse input or input through a keyboard 122.

Figure 2:
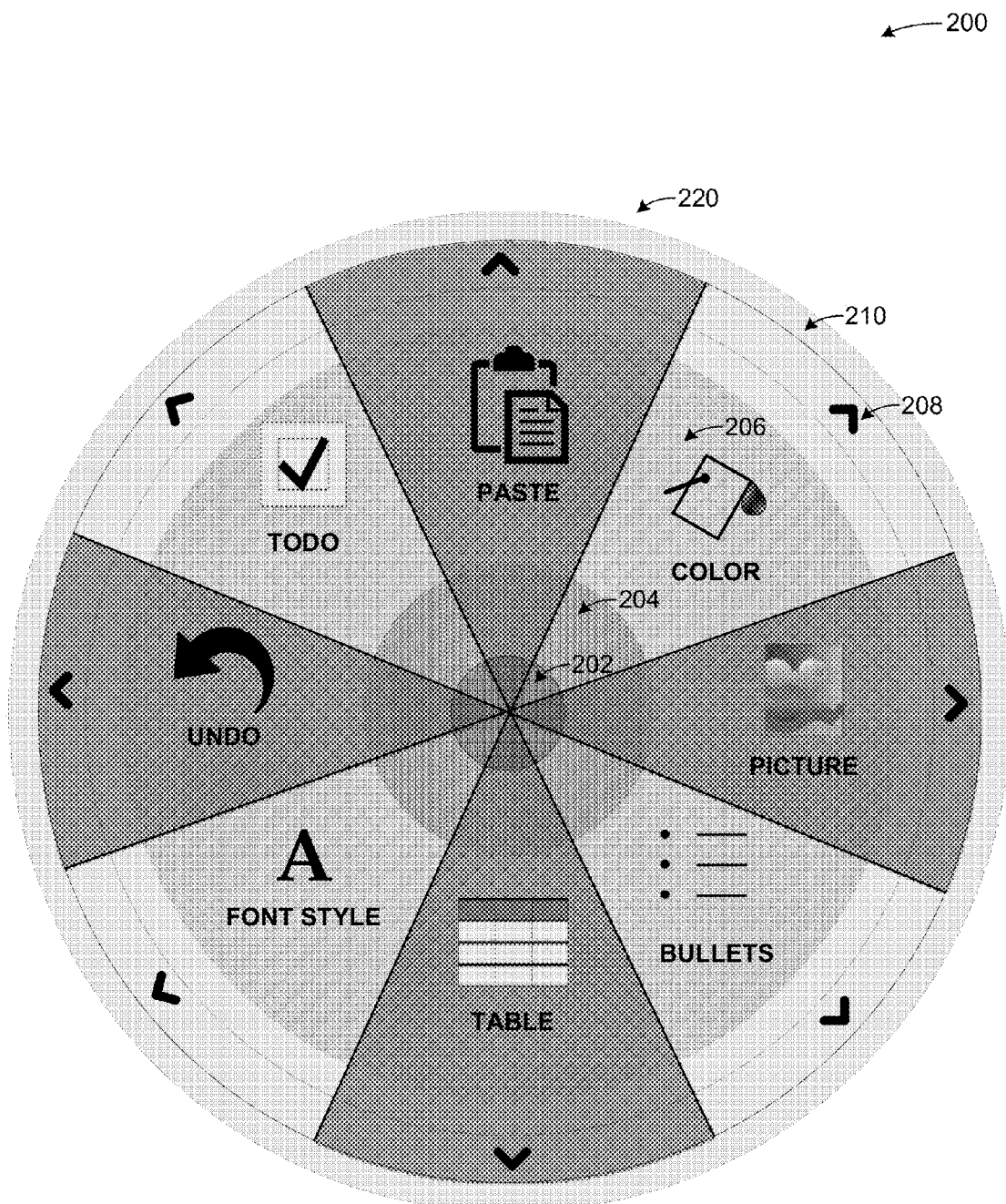
FIG. 2 illustrates an example context based menu according to embodiments.

FIG. 2 illustrates an example context based menu according to embodiments. The example context based menu 220 in diagram is shown with a radial shape, but embodiments may be implemented using other forms or shapes. The context based menu may provide functionality such as commands, links, and sub-menus suitable for managing displayed content. In an example scenario, the context based menu 220 may display commands to edit a textual content including, but not limited to, change font style, insert/remove/edit a table, and insert/edit bullets. In some cases, the menu may provide a command that can be executed directly through the displayed element (e.g., icon). In other cases, the displayed element may activate a sub-menu that includes more detailed commands associated with a particular aspect of content. For example, a sub-menu may be activated through a table icon (and/or text) on a parent menu and display commands associated with different aspects of creating and editing tables (e.g., adding/removing rows/columns, editing cell characteristics, etc.).

Additionally, the context based menu 220 may display generic user interface commands such as paste and undo. The context based menu 220 may also provide commands to manage hybrid displayed content such as documents containing text and images. Examples may include commands to insert a picture to the document or alter a color scheme of the picture through a fill color command. The context based menu 220 may also be customizable to display useful links to launch or bring forward background applications such as a TODO list. Customization may depend on viewed content and usage patterns such as number of times a user accesses an application while managing a displayed content type. In addition to usage based customization, end user customization—the ability for a user to be able to change the set of commands that are available on context based menu—may also be enabled in a system according to embodiments. Furthermore, developer customization—the ability for a developer to add or change (for all their users) the commands that are available—may further be enabled according to some embodiments.

The context based menu 220 may have a center command button such as a launcher indicator 202. In addition to activating the context based menu 220, the launcher indicator may also collapse the context based menu 220. In some embodiments, the center button may be used for executing commands (by gesturing through the launcher), as a quick way to bring up labels, and/or as a way to move around the context based menu on the canvas. The center area may also become the launcher indicator in the collapsed state. A larger hit target than the visual indicator may be used to detect touches on the indicator (in the collapsed state). Alternatively, a user may activate the launcher indicator 202 or provide a gesture imitating the activation action to collapse the context based menu 220. The collapse action may minimize the context based menu 220 or hide it from view within the user interface. Additionally, area 204 may be an unreactive region to minimize incorrect user action detection between a collapse/activation action and other user actions provided by the context based menu 220. One of the reasons for the region 204 is for detecting swipes. If a user swipes out from the center, the amount of distance that covers an angle relative to a predefined axis for any given command may be so small that the user may frequently execute a command they did not expect. For example, in the figure, if the user swipes out toward a color at a 45 degree angle, they might actually get a picture if the swipe is detected within the region 204.

Region 206 may include a command or a link to accomplish functionality provided by the context based menu 220. The command may be executed upon detecting a user action in region 206. Alternatively, a link may be launched according to detected user action in region 206.

According to an embodiment, sub-menu launcher indicator 208 may enable a user to activate a sub-menu associated with a command or link embedded in region 206. The sub-menu may be tailored to provide additional features related to link or command in region 206. An example sub-menu may be a color palette associated to fill in color command in region 206 of the context based menu 220.

According to other embodiments, outer region 210 may correspond to a cancel action. Upon detecting a user action extending to the region 210, the user interface may cancel previously detected user action to execute a command or launch a link. An example may be a user finger (or pen) swipe over region 206 ending in region 210. The region covering launcher indicator 202 may also be defined as a cancel region. Once the user has their finger down, if they move back into the center, then this action may also be interpreted to cancel any action. One of the aspects of a radially designed context based menu is that directionality and not distance dictate what command is executed. As a result, a cancel region may be used over two times the radius of the radial menu out from the center. This means that a user can swipe relatively far out without getting into the cancel region (for illustration purposes, in the drawing, the impression is given that the cancel region is immediately outside the menu).

Of course, other icons, symbols, textual content, etc. may be used to represent specific context based menus and sub-menus. According to some embodiments, a context based menu may be activated without a launcher indicator being displayed. For example, the menu may be presented directly in response to selection of a portion of the displayed content. Additionally, the context based menu may also be presented according to detection of a predefined gesture or touch based user action.

Figure 3:
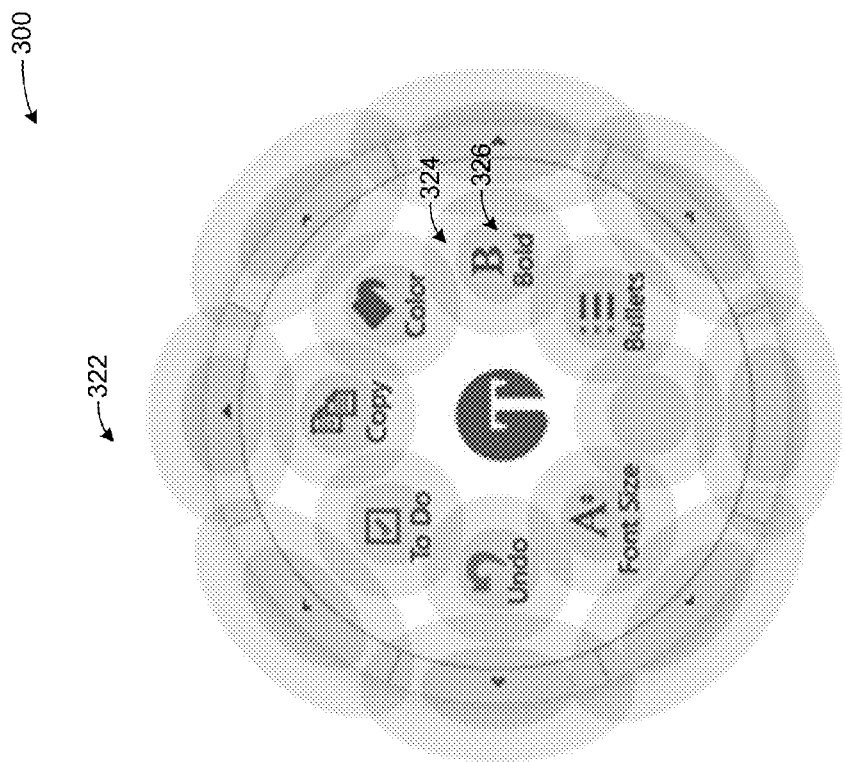
FIG. 3 illustrates example scenarios for determining gestures in context based menus according to embodiments.
Figure 3:
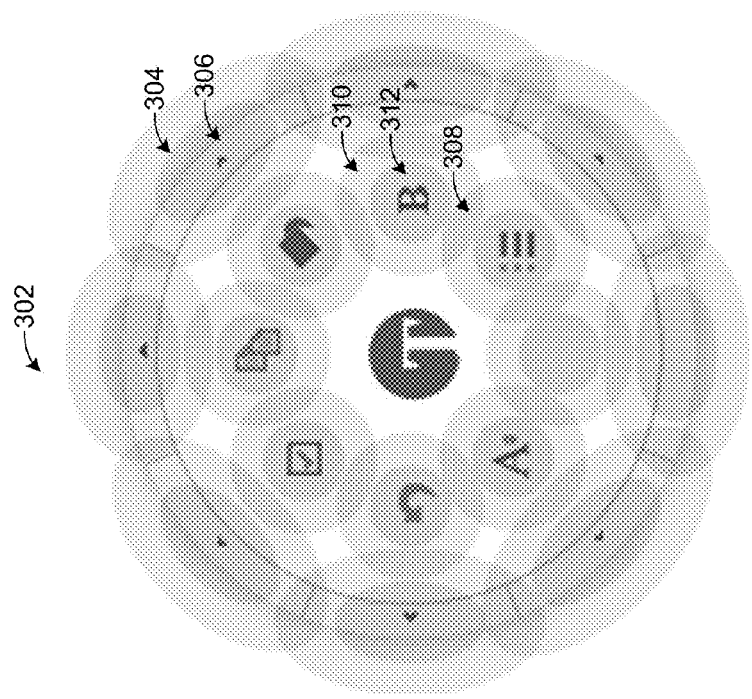

FIG. 3 illustrates example scenarios for determining gestures in context based menus according to embodiments. Diagram 300 displays example context based menus target hit regions.

As previously stated, a user action such as a tap or a swipe action may be detected and analyzed to determine a gesture associated with the user action. The gesture may be subsequently executed to accomplish an event on the context based menu. Event examples may include a command associated with an icon, a link, a sub-menu launcher, etc. In an example context based menu 302, the user interface may detect a tap action in a hit target region such as a primary hit target region 306 or 312. A primary hit target region may be a region centered around a command, a link, or a sub-menu launcher. The primary hit target region may expand beyond an outline of underlying graphics representing the command, the link, or the sub-menu launcher. Detecting a tap action within the primary hit target region may determine a gesture as an activation event of the command, the link, or the sub-menu launcher contained within the primary hit target region.

Alternatively, the user interface may detect a tap action in a secondary hit target region such as secondary hit target regions 304 and 310. Determination of a gesture corresponding to the tap action in the secondary hit target region may depend on a tap action history analysis. The gesture may be associated with an event recorded most often in the tap action history associated with the detected tap action. An example may be launching of a sub-menu within primary hit target region 306. Another example may be execution of a command within a primary hit target region 312.

In another embodiment, a gesture associated with a tap action 308 in between two commands may be determined according to a weighing analysis. An example may be expansion of primary hit target region to encapsulate the in between tap location subsequent to a tap action history analysis.

In some examples, no action may be taken if a tap action is detected between the two regions in 304. In other examples, a tap action duration may be analyzed to execute alternative commands and sub-menu launcher actions. A detected short tap action in primary hit target region 326 may determine a gesture to display additional information about the command within the primary hit target region 326. The duration of the tap action may be determined by a system configuration setting which may be adjustable manually or dynamically. A short tap action in a secondary hit target region 324 may also serve to display additional information about the command within the primary hit target region 326. Additional information may be displayed upon a gesture determination through an analysis of the tap action duration.

According to another embodiment, the user interface may determine a gesture as an activation event of a command. The gesture may be determined upon detecting the tap action within a primary hit target region centered around the command of the context based menu. Additionally, the primary hit target region may have an oval shape. The use of an oval enables the menu to adapt the hit target to the shape of the radial menu regions (as hit targets are often represented as rectangles), avoiding overlap, but to get a larger hit target than just a circle. An additional aspect of the oval shape is that from a performance perspective it may be faster to calculate the hit target in an oval than in a complex shape (such as a pie shape). Furthermore, size of the primary hit target region may be determined according to a user interface configuration setting. In some embodiments, the system may be enabled to learn from the size of the user's fingers and adjust automatically. The user interface configuration setting may be a range with an upper boundary value to prevent an overlap with another primary hit target region of another command. The range may also have a lower boundary value to provide a minimum hit target region to substantially detect the tap action.

According to another embodiment, the user interface may detect a tap action in a secondary hit target region centered around a command of the context menu but outside the primary hit target region. To determine an associated gesture, a system according to embodiments may evaluate a tap action history associated with the secondary hit target region. The system may determine the gesture as an event recorded most often in the tap action history. An example of the event may be execution of the command within the primary hit target region.

According to yet another embodiment, the system may apply a weighting value to determine the gesture for a tap action in between a command and another command of the context based menu. The system may determine the weighting value from a tap action history associated with the tap action. The system may evaluate the tap action history for an event recorded most often in the tap action history. An example may be a user preference for execution of a particular command associated with a detected tap action in a secondary hit target region. Additionally, upon detecting a tap action in between two commands, the size of primary hit target region associated with the recorded event may be expanded according to a weighting value. The expansion may encapsulate the tap action within the primary hit target region as such leading to a determination of a gesture to activate the command within the primary hit target region.

According to another embodiment, the system may determine the gesture according to a location of the tap action. The system may select a gesture corresponding to an activation event of a command nearest to the location of the detected tap action.

Figure 4:
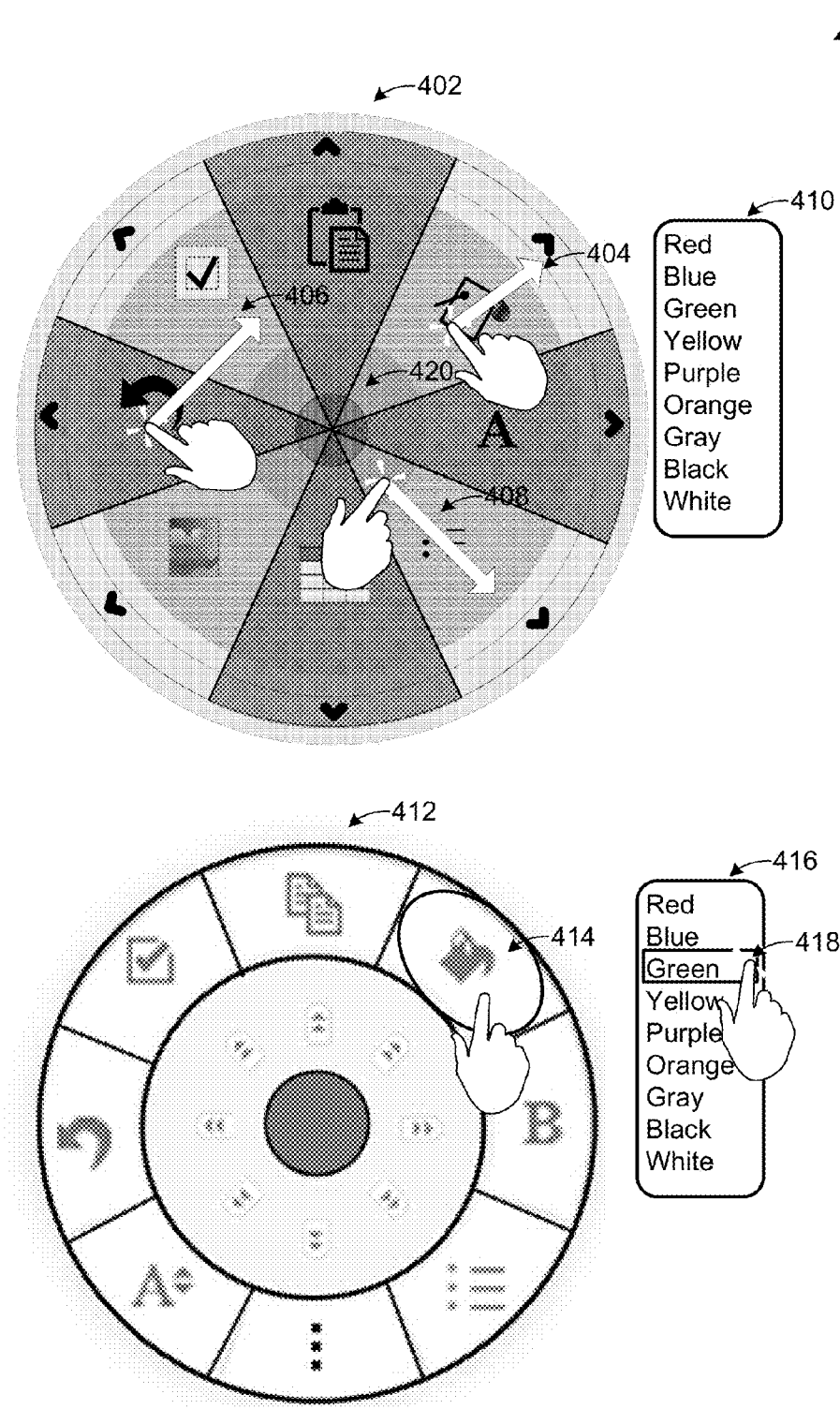
FIG. 4 illustrates additional example scenarios for determining gestures in context based menus according to embodiments.

FIG. 4 illustrates additional example scenarios for determining gestures in context based menus according to embodiments. Diagram 400 displays example context based menus in tap and swipe action scenarios. In an example context based menu 402, a swipe action 404 may be determined to match a gesture launching a sub-menu 410. A system according to embodiments may ignore a swipe action 406 between commands in a same level of the context based menu as a faulty swipe action. Alternatively, the system may ignore a swipe action 408 originating from or ending in a dead zone 420 around a center region of the context based menu. The dead zone 420 may prevent the user from mistakenly activating commands by concentrating a swipe action around command or sub-menu launcher regions. In some embodiments, the swipe action may be designated as valid but the endpoint may just be used as the final location to execute. Two other swipes may also be ignored. First, if a swipe goes through an empty region like the bottom of FIG. 3 or even the table region in FIG. 5 (between the font size and the bullets), then no command may be executed even if the user later moves their finger over a command. The second swipe that may be ignored that the user may navigate only one level with a swipe. If a user wants to navigate multiple levels, they may need to lift their finger and navigate a second level.

According to embodiments, the system may evaluate angle and direction of the swipe action from a center of the context based menu to determine the gesture associated with the swipe action. Additionally, the system may match a length of the swipe action against a set of minimum activation distances. The system may determine the gesture associated with a matching minimum activation distance value. A short activation distance value may match a gesture to activate a command. A long activation distance value may match a gesture to launch a sub-menu associated with the command.

According to another embodiment, the system may detect a tap action within a hit target region 414 of the context based menu 412. The system may launch a sub-menu 416 subsequent to the tap action. The system may detect another tap action within a target hit region 418 of a command of the sub-menu. The hit target region may have a shape corresponding to the shape of the sub-menu. The hit target region may have a shape including an oval shape, a trapezoid shape, a rectangular shape, a triangular shape, and an irregular shape.

A swipe action according to embodiments does not have to originate from the center. If the user puts their finger down on a command, for example, and then swipes over the sub-menu launcher, they may also navigate into the sub-menu. Moreover, the directionality of the swipe may be employed in some embodiments. For example, swiping inward from an outer area toward the center may not execute the command while swiping outward may execute the command. Also, swiping from the center outward may execute a command (such as navigation to a submenu), but swiping from the outside into the center, and then back from the center to the outside as part of the same gesture, may not execute the command. Thus, the swipe from the center outward may change behavior based on where the swipe started originally. In other context based menu shapes and configurations, length, direction, and/or angle of the gesture may be implemented in interpretation according to the context based menu shape, size, and configuration. For example, in a substantially linear or slightly curved menu styles, a center based angle may not be used for gesture interpretation.

Figure 5:
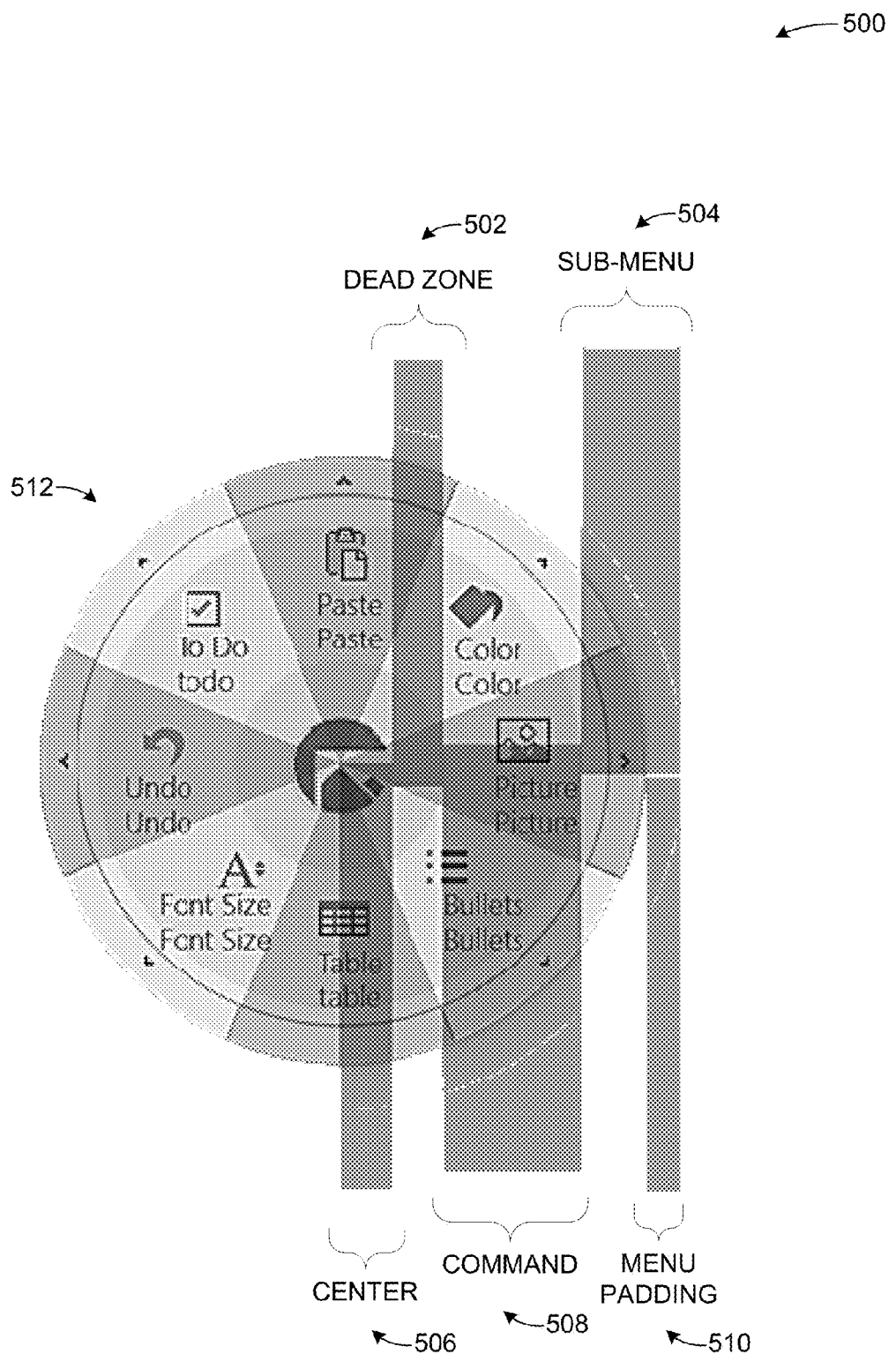
FIG. 5 illustrates example predefined zones for interpreting gestures on a context based menu.

FIG. 5 illustrates example predefined zones for interpreting gestures on a context based menu. In the example context based menu 512 of diagram 500, slices of the menu associated with each displayed item are emphasized using different shades. Additionally, different concentric zones for interpreting a gesture on the menu are shaded in varying tones as well.

For example, at the center of the context based menu, a center zone 506 may define the target hit area for a collapse control, another control, or an additional cancel region as discussed previously that may be defined in the central area of the menu). Due to small size and difficulty of detecting angles in this zone, this part of the menu may be dedicated to tap or press-and-hold type actions as opposed to a swipe. A command zone 508 may begin following a dead zone around 502 around the center zone 506 extending to a perimeter of the command items region. The dead zone 502 may be provided to eliminate or reduce confusion for gestures that may cross the boundary between the center zone 506 and the command zone 508. The command zone 508 has a hollow circle shape in this example, but may be implemented in other shapes depending on the shape and size of the underlying context based menu. The command zone 508 is divided into the number (and size) of slices as the items on the context based menu.

Following the command zone 508, a sub-menu zone 504 may begin at or slightly before a border between the command icons region and sub-menu extension region from a perspective of the context based menu's center. This region enables a user to launch sub-menus by a gesture (e.g., a swipe or tap) associated with each command (in respective slices). In the illustrative example context based menu, the sub-menu region is relatively narrow potentially making detection of gestures in this zone difficult. To mitigate the narrow region, a menu padding zone 510 may be provided expanding the sub-menu zone 504. The padding region is invisible. The radial menu visual ends and then the "padding" is a hidden region that still collects touch events. Thus, it increases the confidence of using the radial menu without negatively impacting the size of it.

The example commands, links, sub-menus, configurations, and context based menus depicted in FIGS. 1 through 5 are provided for illustration purposes only. Embodiments are not limited to the shapes, forms, and content shown in the example diagrams, and may be implemented using other textual, graphical, and similar schemes employing the principles described herein.

Figure 6:
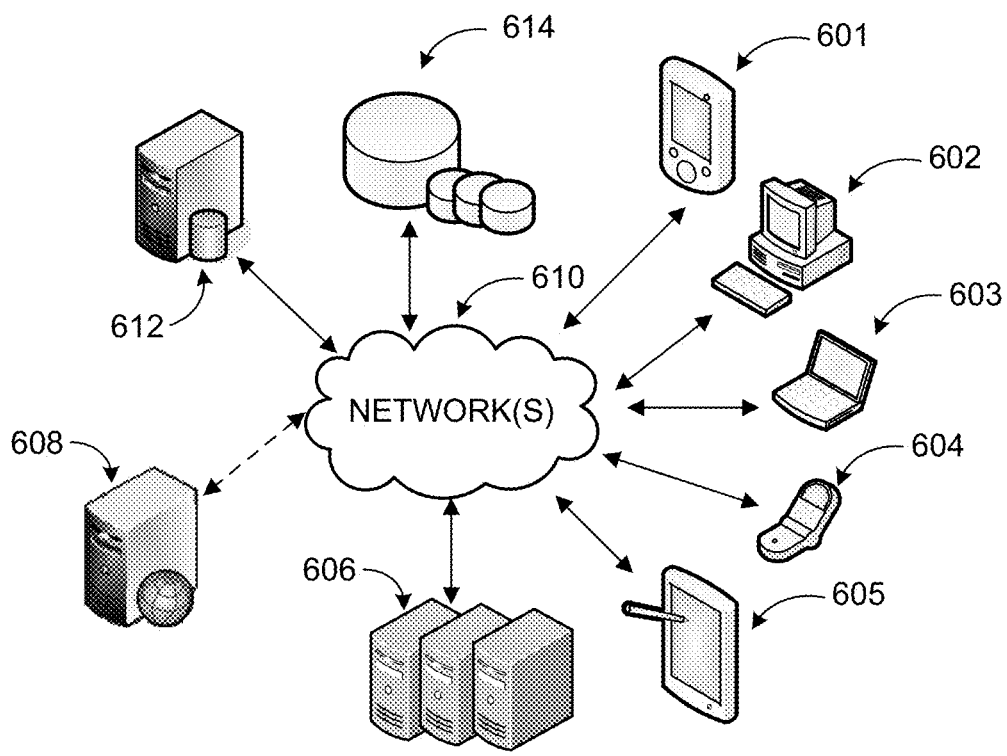
FIG. 6 is a networked environment, where a system according to embodiments may be implemented.

FIG. 6 is a networked environment, where a system according to embodiments may be implemented. In addition to locally installed applications, such as application 622 discussed below, a context based menu for touch and/or gesture enabled devices may be also be employed in conjunction with hosted applications and services that may be implemented via software executed over one or more servers 606 or individual server 608. A hosted service or application may be a web-based service or application, a cloud based service or application, and similar ones, and may communicate with client applications on individual computing devices such as a handheld computer 601, a desktop computer 602, a laptop computer 603, a smart phone 604, a tablet computer (or slate) 605 ('client devices') through network(s) 610 and control a user interface presented to users. One example of a web-based service may be a productivity suite that provides word processing, spreadsheet, communication, scheduling, presentation, and similar applications to clients through a browser interface on client devices. Such a service may enable users to interact with displayed content through context based menus and a variety of input mechanisms as discussed herein.

As previously discussed, a gesture on a context based menu may be determined according to a user action analysis provided by the hosted service or application. For example, a tap action may be analyzed according to hit target region analysis. A swipe action may be analyzed according to direction and length of the swipe action within a context based menu according to embodiments.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to determine a gesture on a context based menu. Furthermore, the networked environments discussed in FIG. 6 are for illustration purposes only. Embodiments are not limited to the example applications, modules, or processes.

Figure 7:
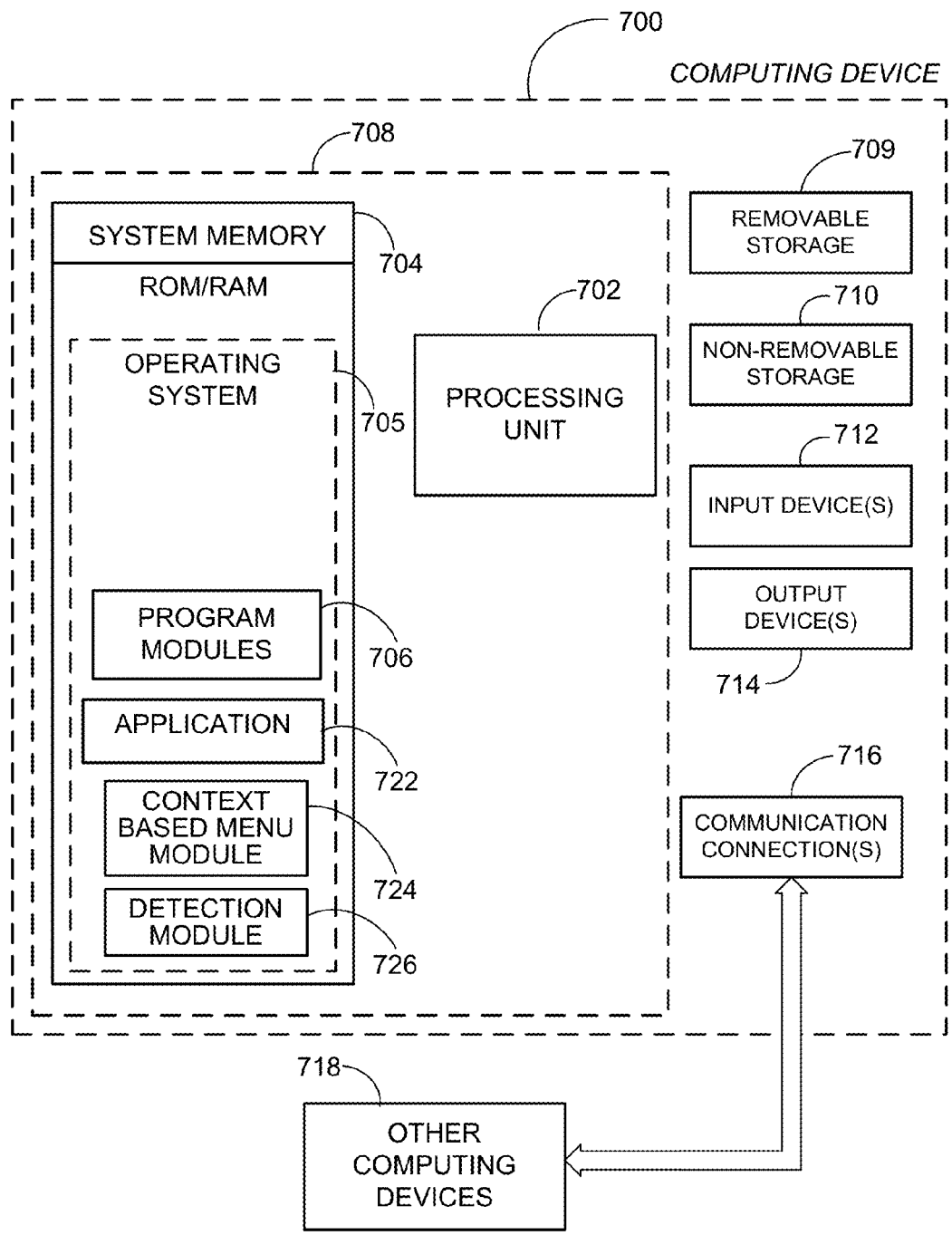
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment according to embodiments is illustrated, such as computing device 700. In a basic configuration, computing device 700 may be any device in stationary, mobile, or other form such as the example devices discussed in conjunction with FIGS. 1A, 1B, and 6, and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS®, WINDOWS MOBILE®, or WINDOWS PHONE® operating systems from MICROSOFT CORPORATION of Redmond, Wash. The system memory 704 may also include one or more software applications such as program modules 706, application 722, context based menu module 724, and detection module 726.

Context based menu module 724 may operate in conjunction with the operating system 705 or application 722 and provide a context based menu as discussed previously. Context based menu module 724 may also provide commands, links, and sub-menus to manage displayed content. Detection module 726 may detect user actions and determine a gesture associated with a command, a link, or a sub-menu. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an optical capture device for detecting gestures, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
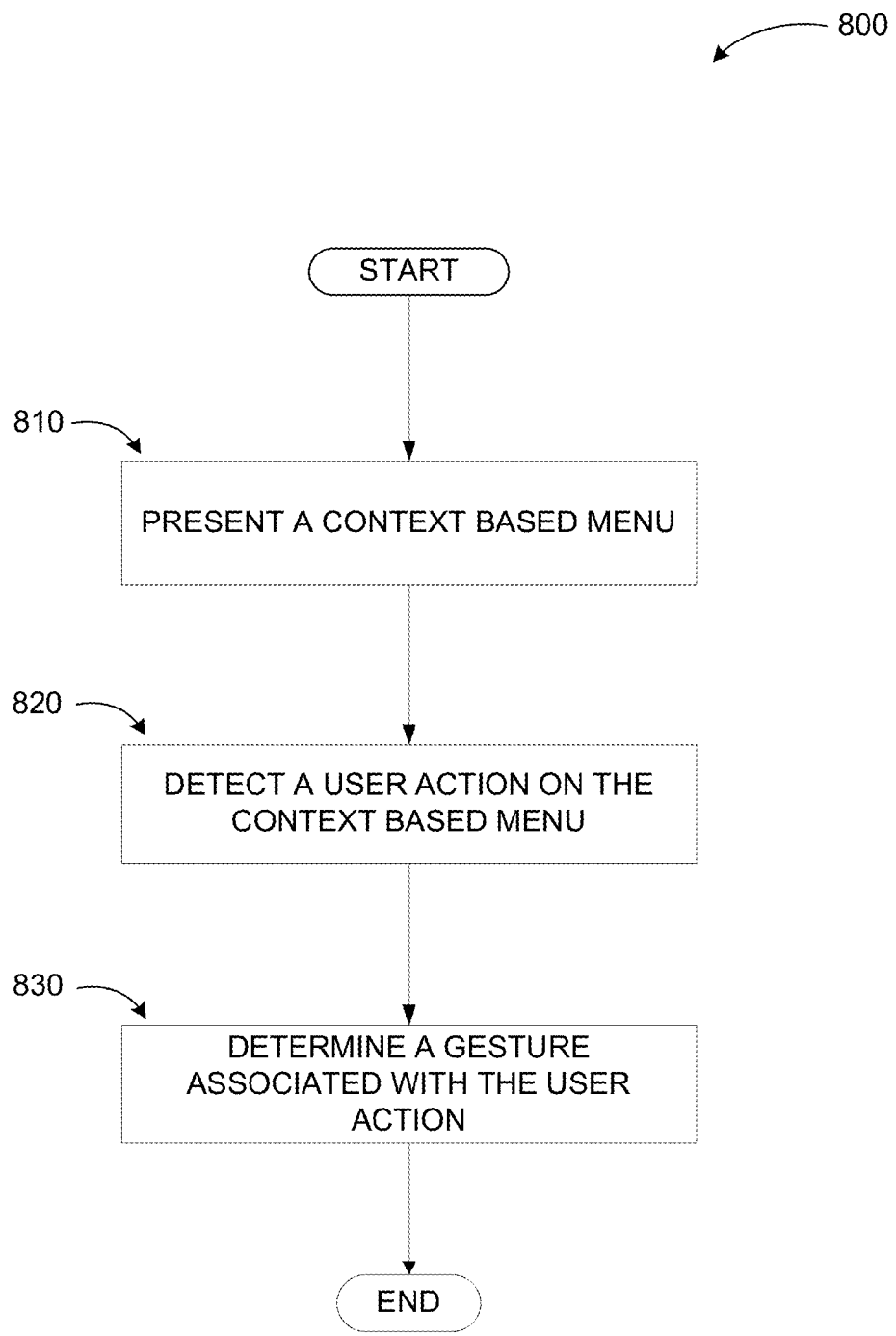
FIG. 8 illustrates a logic flow diagram for a process of determining gestures on a context based menu in touch and gesture enabled devices according to embodiments.

FIG. 8 illustrates a logic flow diagram for a process of determining a gesture on a context based menu in touch and/or gesture enabled devices according to embodiments. Process 800 may be implemented as part of an application or an operating system of any computing device capable of accepting touch, gesture, keyboard, mouse, pen, or similar inputs.

Process 800 begins with operation 810, where a context based menu may be presented by a user interface. The context based menu may be presented in response to detecting a tap action on a launcher, a tap action on a selection of a portion of displayed content, an insertion point, a tap action on a selection gripper, a swipe action on the launcher slower than a predefined speed, a mouse input, or a keyboard input corresponding to the mouse input. Subsequently, the user interface may detect a user action on the context based menu at operation 820. The user action may be a tap action or a swipe action. At operation 830, a system associated with the user interface may determine a gesture associated with the user interface. The system may analyze a hit target region of a tap action to determine the gesture associated with the tap action. Alternatively, the system may analyze a direction, an angle, and/or a length of a swipe action to determine the gesture associated with the swipe action.

The operations included in process 800 are for illustration purposes. Determining gestures on context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device to determine a tap action on a context based menu, the method comprising:
   in response to detecting a tap action presenting the context based menu in relation to a displayed content on a user interface, wherein the context based menu comprises:
   radially distributed command items around a collapse control,
   a center zone that defines a target hit area for the collapse control,
   a dead zone surrounding the target hit area for the collapse control,
   a command zone surrounding the dead zone, and
   a sub-menu zone surrounding the command zone, the command zone and the sub-menu zone including primary hit target regions and secondary hit target regions surrounding each command item within the command zone;
   in response to detecting the tap action in a primary hit target region centered around a command item, interpreting the tap action as an activation event associated with the command item;
   in response to detecting the tap action in a secondary hit target region around the command item, the secondary hit target region surrounding the primary hit target region,
   interpreting the tap action based on a tap action history analysis, wherein the tap action history analysis includes a detection of a most recorded event that is associated with an activation of the command item and another command item adjacent to the command item, wherein secondary hit target regions of the command item and the other command item overlap.

2. The method of claim 1, wherein the primary hit target region has one of: a circular, a rectangular, an oval, and an irregular shape.

3. The method of claim 1, wherein at least one of a size and a shape of the primary hit target region is determined according to a user interface configuration setting.

4. The method of claim 3, wherein the at least one of a size and a shape of the primary hit target region is adjusted based on an automatic learning process from a size of a user's finger.

5. The method of claim 1, wherein the context based menu has a radial shape and is divided into equal slices, each slice containing one command item.

6. A computing device to determine a swipe action on a context based menu, the computing device comprising:
an input device configured to detect a swipe action;
a memory;
a processor coupled to the memory, the processor executing an application and causing a user interface associated with the application to be displayed on a screen, wherein the processor is configured to:
in response to detecting the swipe action, present the context based menu in relation to a displayed content on the user interface, wherein the context based menu comprises:
radially distributed command items around a collapse control,
a center zone that defines a target hit area for the collapse control,
a dead zone surrounding the target hit area for the collapse control,
a command zone surrounding the dead zone, and
a sub-menu zone surrounding the command zone, the command zone and the sub-menu zone including primary hit target regions and secondary hit target regions surrounding each command item within the command zone;
in response to a detection of the swipe action originating from the center zone or the dead zone of the context based menu, ignore the swipe action;
in response to a detection of the swipe action from the command zone, determine whether the swipe action is a short swipe action or a long swipe action based on a length, a direction, and an angle of the swipe action; and
if the swipe action is a short swipe action, interpret the swipe action as an activation event associated with the command item;
if the swipe action is a long swipe action, interpret the swipe action as an activation of a sub-menu associated with the command item.

7. The computing device of claim 6, wherein the processor is further configured to:
compare the length of the swipe action to a set of minimum activation distances from a predefined starting point on the context based menu;
determine the action based on a matching minimum activation distance; and
in response to a detection that the swipe action is from outside towards a center of the context based menu and then back from the center towards the outside, not execute one from the set of a first command and a second command associated with the swipe action.

8. The computing device of claim 7, wherein the processor is further configured to:
determine the first command and the second command based on the angle of the swipe action relative to a predefined origin axis, wherein the first command item, the second command item, and other command items on the context based menu are positioned in sections separated by equal angle increments.

9. The computing device of claim 6, wherein the processor is further configured to:
ignore the swipe action in response to a detection that the swipe action crosses from a first section associated with a first command item to a second section associated with a second command item in a same level within the context based menu.

10. A method to determine a tap action on a context based menu, the method comprising:
in response to detecting a tap action, presenting the context based menu in relation to a displayed content on a user interface, wherein the context based menu comprises:
radially distributed command items around a collapse control,
a center zone that defines a target hit area for the collapse control,
a dead zone surrounding the target hit area for the collapse control,
a command zone surrounding the dead zone, and
a sub-menu zone surrounding the command zone, the command zone and the sub-menu zone including primary hit target regions and secondary hit target regions surrounding each command item within the command zone;
in response to detecting the tap action in a primary hit target region centered around a command item, interpreting the tap action as an activation event associated with the command item, wherein the at least one of a size and a shape of the primary hit target region is adjusted based on an automatic learning process from a size of a user's finger;
in response to detecting the tap action in a secondary hit target region around the command item, the secondary hit target region surrounding the primary hit target region,
interpreting the tap action based on a tap action history analysis, wherein the tap action history analysis includes a detection of a most recorded event that is associated with an activation of the command item and another command item adjacent to the command item, wherein secondary hit target regions of the command item and the other command item overlap.

11. The method of claim 10, further comprising:
detecting the tap action in the primary hit target region of one of: a sub-menu launcher and an indicator to control expand and collapse actions on the context based menu.

12. The method of claim 11, wherein the primary target region for detecting the tap action has a shape that is distinct from an outline of an underlying visible graphics, and wherein the primary target region includes at least one from a set of: an oval shape, a square shape, a trapezoid shape, a rectangular shape, a triangular shape, and an irregular shape.

* * * * *